United States Patent
Mathews

[15] 3,643,005
[45] Feb. 15, 1972

[54] CONDUIT WITH SPACER

[72] Inventor: Lyle H. Mathews, 2712 W. Porter St., #2, Fullerton, Calif. 92633

[22] Filed: Aug. 5, 1970

[21] Appl. No.: 61,066

[52] U.S. Cl. ............................ 174/37, 61/72.4, 138/105, 138/106, 138/113, 174/96, 174/99 R
[51] Int. Cl. ............................................................ H02g 9/06
[58] Field of Search .............. 174/28, 37, 96, 98, 99 R, 111, 174/135; 46/221; 61/72.2, 72.4, 72.1; 138/103, 105, 106, 108, 111–114; 248/49; 264/277; 301/63 R, 63 PW, 65, 86

[56] References Cited

UNITED STATES PATENTS

| 251,552 | 12/1881 | Edison | 174/111 X |
|---|---|---|---|
| 252,857 | 1/1882 | Gore | 174/111 X |
| 276,472 | 4/1883 | Rittenhouse et al. | 174/111 X |
| 792,892 | 6/1905 | Gest | 174/99 R |
| 1,267,724 | 5/1918 | Watson | 46/221 |
| 1,805,990 | 5/1931 | Makowski | 138/106 X |
| 1,856,538 | 5/1932 | Case | 46/221 UX |
| 2,274,031 | 2/1942 | Bannon | 174/28 X |
| 2,631,897 | 3/1953 | Ewart | 301/65 |
| 3,329,816 | 7/1967 | Grundhauser et al. | 174/28 UX |

FOREIGN PATENTS OR APPLICATIONS

| 856,241 | 3/1940 | France | 174/28 |
|---|---|---|---|
| 857,866 | 1/1961 | Great Britain | 301/63 PW |
| 957,239 | 5/1964 | Great Britain | 46/221 |

*Primary Examiner*—Laramie E. Askin
*Attorney*—Hinderstein & Silber

[57] ABSTRACT

A unitary spacer for maintaining separation between electrical conduits in a ditch. The spacer comprises a short tubular section adapted to slide over the conduit, an annular disc portion extending radially outwardly from the tubular section, and a flanged rim at the periphery of the disc portion. A plurality of circular openings through the spacer disc portion cooperate with a locking pin to permit connection of adjacent spacers if desired; the openings also permit concrete to flow through the spacer while embedding the conduit.

11 Claims, 3 Drawing Figures

INVENTOR.
LYLE H. MATHEWS
BY
Hinderstein & Silber
ATTORNEYS

3,643,005

CONDUIT WITH SPACER

BACKGROUND OF THE INVENTION

1. Field of the Invention

The present invention relates to a spacer for maintaining separation between electrical conduits.

2. Description of the Prior Art

In conventional underground installation of electrical cables, the cables are run through conduits placed in a ditch and embedded in concrete. These conduits generally are less than 6 inches in diameter. More important, utility company specifications and municipal code requirements often set forth a minimum spacing between adjacent conduits in a ditch, and between each conduit and the bottom or sides of the ditch. Typically, a minimum spacing of 2 inches is required between conduits carrying communication or signal lines, while a 3 inch minimum separation commonly is required for conduits carrying electrical power lines.

In the past, baseplates or spacers not unlike those shown in U.S. Pat. No. 2,462,399 to Hinchman have been used to support electrical conduits above the floor of a ditch, and/or to maintain separation between adjacent conduits. A problem encountered with baseplate-type supports is that as concrete is being poured into the ditch to embed the conduit, the force of the concrete tends to shift the position of the conduit on the baseplate. Thus, to insure that the minimum required separation will be maintained while pouring the concrete, it often is necessary to tie the conduit to the baseplate. Such tying operation is time consuming, and hence adds considerably to the cost of underground conduit installation.

Another approach of the prior art has been to provide coupling colors at the joints between adjacent conduit sections. These coupling colors are generally square in shape, typically having a cradle at the top for receiving another conduit. Such coupling collars have significant disadvantages. For example, they can be used only at the intersection of adjacent conduit sections, thus significantly limiting their placement within the ditch. Moreover, each conduit must be placed carefully in the ditch atop the cradle of the subjacent conduit.

Most important, such prior art coupling collars normally are solid. Thus, when concrete is poured into the ditch to embed the conduit assembly, lateral flow of the concrete is blocked by the collars. Often, this resulted in voids or spaces adjacent the collars which are free of concrete. Such spaces represent shear points at which the conduit may break or sever should movement of the ground occur. This problem is particularly acute in areas where earthquake tremors are prevalent.

The foregoing and other shortcomings of the prior art are overcome using the inventive unitary spacer for electrical conduits. The spacer readily may be slid over a conduit, and positioned anywhere along the length thereof. Since the spacer is circular, minimum spacing is insured between adjacent conduits or between the conduit and the wall or floor of the ditch, even though the conduit is not carefully placed in the ditch or shifts in position during pouring of concrete. Moreover, by providing large openings in the spacer, concrete will flow through the spacer as the conduits are being embedded, thus insuring an assembly having no concrete voids, and hence free of shear points likely to break in an earthquake.

SUMMARY OF THE INVENTION

In accordance with the present invention there is provided a unitary spacer for electrical conduits. The spacer comprises a short tubular section having an inner diameter slightly larger than the outer diameter of the conduit with which the spacer is employed. An annular disc-shaped portion of the spacer extends radially outwardly from the tubular section, and is provided at the periphery with a flanged rim. The rim supports the spacer-conduit assembly, while the tubular section maintains the spacer perpendicular to the conduit at all times.

The disc portion of each spacer may be provided with a plurality of circular openings which permit flow-through of concrete while the conduit is being embedded. Further, in conjunction with a tubular locking pin, the openings permit attachment of adjacent spacers if so desired.

Thus it is an object of the present invention to provide a spacer for electrical conduits.

Another object of the present invention is to provide a unitary spacer slideable onto an electrical conduit and configured to permit flow-through of concrete as the conduit is embedded.

Still another object of the present invention is to provide a conduit spacer cooperating with a locking pin to connect adjacent spaced conduits.

A further object of the present invention is to provide a process for embedding electrical conduit in a ditch while maintaining minimum spacing therebetween.

BRIEF DESCRIPTION OF THE DRAWINGS

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein.

DESCRIPTION OF THE PREFERRED EMBODIMENT

Figure 2:
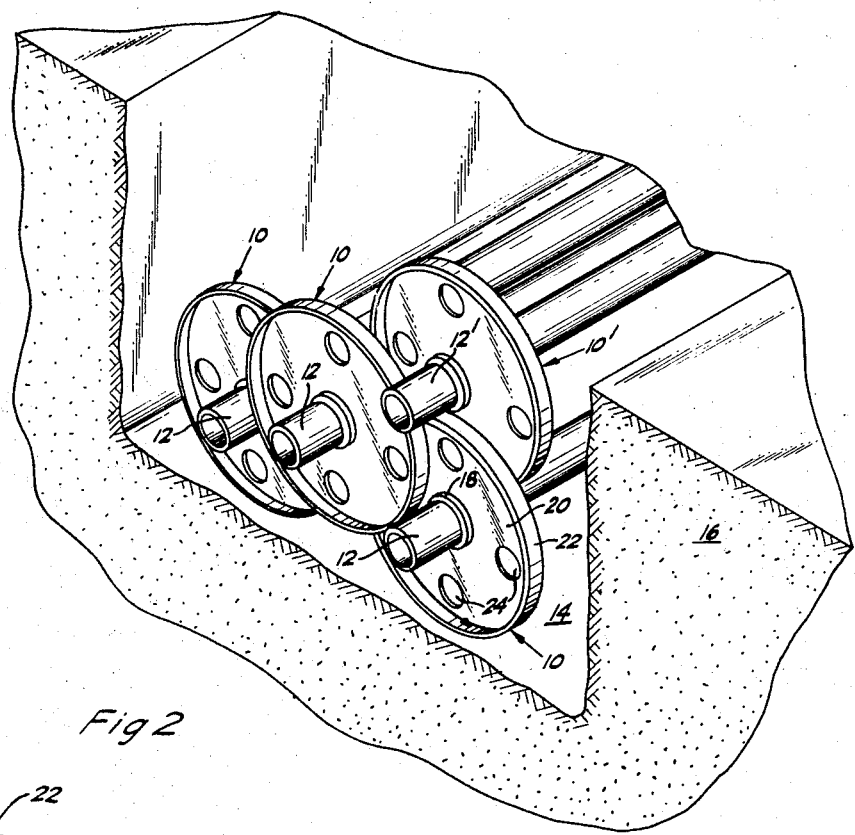
FIG. 2 is a perspective view, partly in section, illustrating a plurality of conduits situated in a ditch and separated by spacers in accordance with the present invention.
Figure 1:
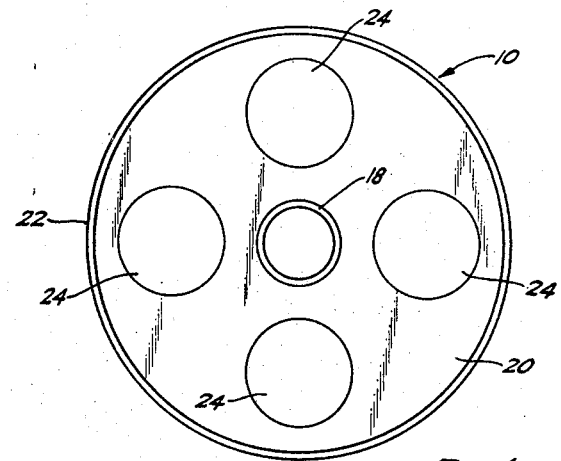
FIG. 1 is a plan view of a conduit spacer in accordance with the present invention.

Referring now to the drawings, and particularly to FIGS. 1 and 2 thereof, there are shown several unitary spacers 10 each constructed in accordance with the teaching of the present invention. Spacers 10 are used to separate a plurality of electrical conduits 12 situated in a ditch 14 dug below the surface of the ground 16. Each spacer 10 preferably is made of plastic.

Each spacer 10 includes a tubular section or sleeve 18 having an inner diameter slightly larger than the outer diameter of conduit 12. Extending radially outwardly from tubular section 18 is an annular disc portion 20, attached to the periphery of which is a flanged rim 22. Tubular section 18 and rim 22 both are perpendicular to the plane of disc-shaped section 20, and may be of equal length. The radial spacing between tubular section 18 and rim 22 preferably corresponds to the minimum acceptable separation between adjacent conduits 12. Disc portion 20 is provided with a plurality of openings 24 permitting flow therethrough of concrete used to embed conduits 12, and also useful for locking together adjacent spacers 10, as described below in connection with FIG. 3.

Referring to FIG. 2, the invention may be employed by placing one or more spacers 10 onto each conduit 12 to be placed in ditch 14. Tubular section 18 maintains the disc-shaped portion 20 of each spacer 10 generally perpendicular to conduit 12, while flanged rim 22 acts effectively to support spacer 10 and conduit 12 either on the floor of ditch 14 or, as illustrated by spacer 10' and conduit 12' in FIG. 2, atop one or more other conduits. In this regard, conduits 12 may be placed randomly in ditch 14, spacers 10 functioning always to maintain the minimum required separation between adjacent conduits or between each conduit 12 and the wall or sides of ditch 14.

Extremely simple conduit installation can be accomplished by placing spacers 10 on each conduit 12 and then rolling the conduit on the spacers into ditch 14. Spacers 10 will insure the required conduit separation even though the conduits are not situated carefully within the ditch or tied to their supports, as required by the prior art. Next, concrete is poured into ditch 14 so as to surround completely conduits 12. As the concrete is poured, some of it will flow through openings 24 in spacers 10. This will insure that even though the concrete may flow toward spacers 10 from only one side thereof, no voids or concrete-free regions will result on the other side of the spacers which might represent earthquake shear points.

Figure 3:
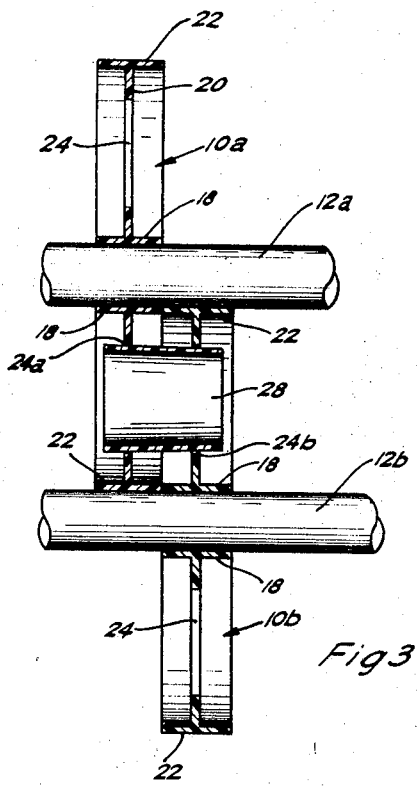
FIG. 3 is a sectional view showing the manner in which two adjacent spacers (each as shown in FIG. 1) may be connected using a locking pin.

If desired, the spacers associated with adjacent conduits may be locked together as illustrated in FIG. 3. As seen therein, a first spacer 10a associated with a conduit 12a is locked to the adjacent spacer 10b associated with a conduit 12b. One opening 24a in spacer 10a is aligned with a corresponding opening 24b in a spacer 10b. Inserted through aligned openings 24a, 24b is a locking pin 28. Locking pin 28 may be cylindrical, or may comprise a tubular, truncated conical section. In either case, locking pin 28 is dimensioned to fit snugly within openings 24a and 24b. Although locking pin 28 may be solid, the tubular form is preferred so that concrete flow therethrough is facilitated as conduits 12a, 12b are embedded.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In an underground installation of electrical cable-carrying conduits positioned in parallel, spaced-apart relationship within a ditch and embedded in concrete, the improvement comprising a unitary spacer maintaining a minimum separation between said electrical cable-carrying conduits, said spacer comprising:
   a sleeve having an inner diameter slightly greater than the outer diameter of said conduit, said sleeve being slid onto said conduit and positioned anywhere along the length thereof;
   a tubular rim having a radius at least equal to said minimum separation between said conduits; and
   means connected between said sleeve and said rim for supporting said sleeve and said rim coaxially, said supporting means having at least one opening therein through which said concrete extends.

2. In an underground installation of electrical cable-carrying conduits according to claim 1, the improvement wherein said sleeve and said rim are circular.

3. In an underground installation of electrical cable-carrying conduits according to claim 2, the improvement wherein said supporting means comprises:
   an annular disclike member extending radially outwardly from said sleeve and connected at its periphery to said tubular rim.

4. In an underground installation of electrical cable-carrying conduits according to claim 3, the improvement wherein said annular disklike member has a plurality of openings therein through which said concrete extends.

5. In an underground installation of electrical cable-carrying conduits according to claim 4 and including a plurality of said spacers, the improvement wherein said openings in said annular disklike member are circular and further comprising:
   a tubular pin having an outer diameter slightly less than the diameter of said circular openings in said annular disclike member, said pin extending through the openings in adjacent spacers thereby locking together said spacers.

6. In combination:
   at least one electrical cable-carrying conduit adapted to be positioned within a ditch and embedded in concrete; and
   at least one unitary spacer for maintaining a minimum separation between said conduit and the walls of said ditch or other conduits, said spacer comprising:
   a sleeve having an inner diameter slightly greater than the outer diameter of said conduit, said conduit extending through said sleeve, said sleeve being positioned anywhere along the length of said conduit;
   a tubular rim having a radius at least equal to said minimum separation between said conduit and the walls of said ditch or other conduits; and
   means connected between said sleeve and said rim for supporting said sleeve and said rim coaxially, said supporting means having at least one opening therein for permitting passage of said concrete therethrough.

7. Apparatus according to claim 6 wherein said sleeve and said rim are circular.

8. Apparatus according to claim 6 further comprising:
   a plurality of said conduits; and
   a plurality of said unitary spacers positioned along the length of each of said conduits.

9. Apparatus according to claim 6 wherein said supporting means comprises:
   an annular disclike member extending radially outwardly from said sleeve and connected at its periphery to said tubular rim.

10. Apparatus according to claim 9 wherein said annular disclike member has a plurality of openings therein for permitting passage of said concrete therethrough.

11. Apparatus according to claim 10 wherein said openings in said annular disclike member are circular and further comprising:
    a plurality of said conduits;
    a plurality of said unitary spacers; and
    at least one tubular pin having an outer diameter slightly less than the diameter of said circular openings in said annular disclike member, said pin extending through the openings in adjacent spacers thereby locking together said spacers.

* * * * *